United States Patent [19]

Djorup

[11] Patent Number: 5,218,865
[45] Date of Patent: Jun. 15, 1993

[54] THERMAL ANEMOMETER TRANSDUCER WIND SET

[76] Inventor: Robert S. Djorup, 20 Lovewell Rd., Wellesley, Mass. 02181-6315

[21] Appl. No.: 568,425

[22] Filed: Aug. 16, 1990

[51] Int. Cl.$^5$ ............................................. G01F 1/68
[52] U.S. Cl. .................................. 73/189; 73/204.26
[58] Field of Search ............... 73/189, 204.22, 204.25, 73/204.26, 204.27

[56] References Cited

U.S. PATENT DOCUMENTS

| | | |
|---|---|---|
| 3,352,154 | 11/1967 | Djorup . |
| 3,498,127 | 3/1970 | Richards . |
| 3,604,261 | 9/1971 | Olin ...................................... 73/189 |
| 3,677,085 | 7/1972 | Hayakawa . |
| 3,900,819 | 8/1975 | Djorup . |
| 3,995,481 | 12/1976 | Djorup .......................... 73/204.26 X |
| 4,024,761 | 5/1977 | Djorup . |
| 4,038,870 | 8/1977 | Rotier ............................. 73/189 X |
| 4,206,638 | 6/1980 | Djorup . |
| 4,279,147 | 7/1981 | Djorup . |
| 4,332,157 | 6/1982 | Zemel et al. ................. 73/204.23 X |
| 4,794,795 | 1/1989 | Djorup . |
| 4,905,513 | 3/1990 | Burgos ............................ 73/189 X |
| 4,936,144 | 6/1990 | Djorup . |

OTHER PUBLICATIONS

Perry, A. E., "Hot-wire anemometry", Oxford University Press, New York, (1982).
Goldstein, Richard J., ed., "Fluid Mechanics Measurements", Hemisphere Publishing Corporation, New York, (1983).

Primary Examiner—Herbert Goldstein
Attorney, Agent, or Firm—Choate, Hall & Stewart

[57] ABSTRACT

A thermal anemometer transducer wind set for determining both wind speed and wind direction having an omnidirectional wind speed resultant sensing transducer element and a component directional anemometer transducer sensing element pair that are all operated as constant temperature anemometers. Omnidirectional element configuration design is disclosed that is used to control element spatial response to wind flow and also determine sign sense of direction. Additional wind set array configurations are disclosed that combine the resultant wind measurement transducer with dual component arrays, three-phase arrays, and a three-dimensional pyramidal array.

19 Claims, 2 Drawing Sheets

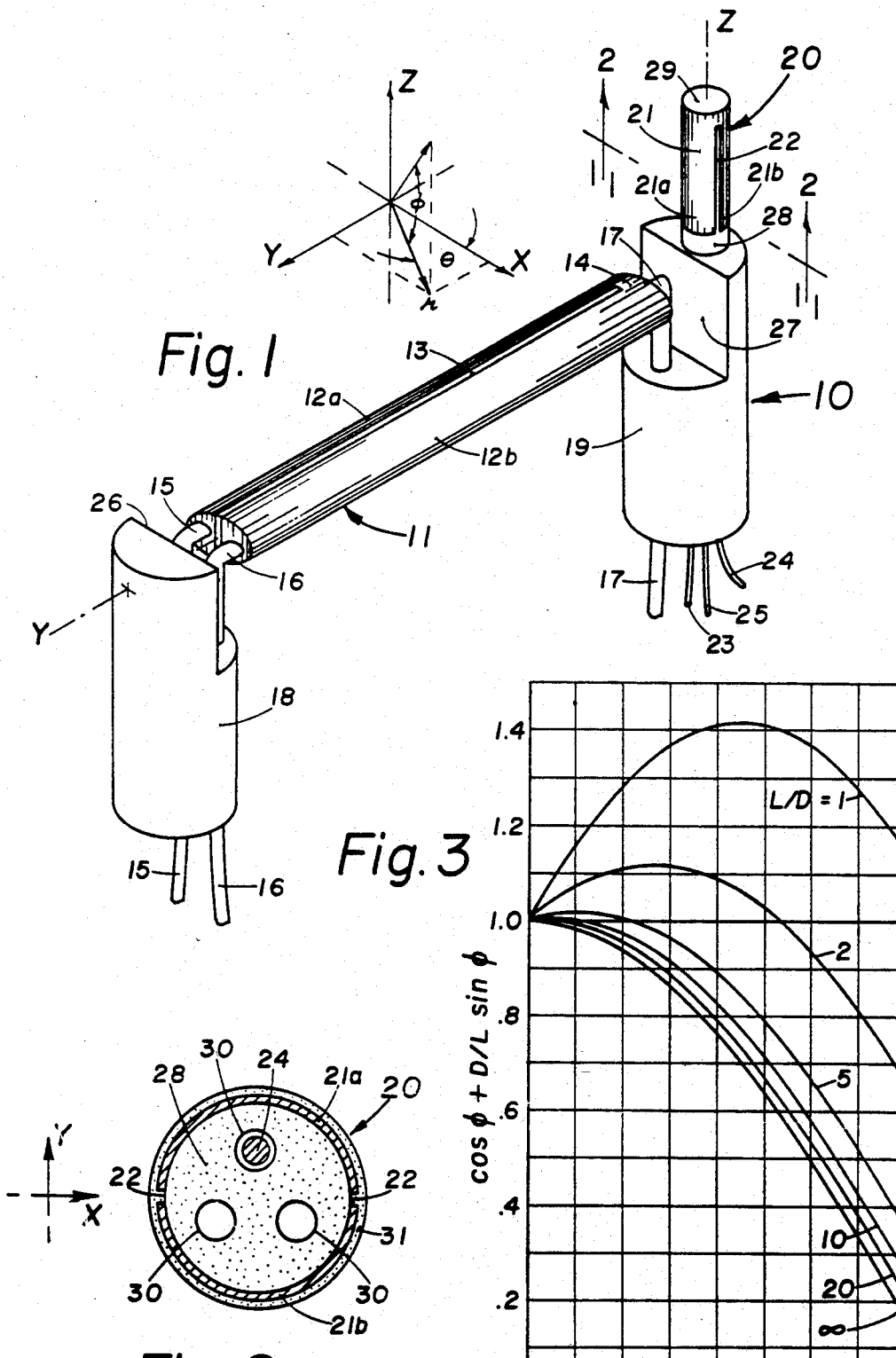

THERMAL ANEMOMETER TRANSDUCER WIND SET

TECHNICAL FIELD

This invention relates generally to an improved anemometer transducer apparatus for determining both wind speed and wind direction. The invention discloses a combination wind set wherein an omnidirectional wind speed sensing element is used to make independent wind speed resultant measurements together with a directional anemometer transducer that is used to make precision measurements of component wind direction, all with no moving parts.

BACKGROUND ART

The use of electrically self-heated resistors, hot wires, and hot films as thermal anemometer transducers is well known in the prior art. In such devices, a heated resistive element serves as a sensing element, and its physical geometry is used to define its spatial response to impinging airflow. The sensing transducer has a non-zero temperature coefficient of resistance and is maintained at feedback-controlled constant resistance. Transducer element pairs are used to determine direction and in some cases they are used to determine both speed and direction.

In a well-executed paired-element directional thermal anemometer, where speed and direction are both differentially read out, advantage is taken of common-mode rejection of unwanted spurious input signals such as those caused by rain, snow, drizzle, fog, salt accretion and the like. Examples of such anemometers are those made in accordance with the teachings of U.S. Pat. Nos. 4,279,147 and 4,794,795.

Earlier directional anemometers, such as those taught by U.S. Pat. Nos. 3,352,154, 3,900,819, 4,024,761, and 4,206,638, use single-ended thermal anemometer sensing element pairs where the velocity or speed component is taken as the sum of the element signals with respect to ground, and direction sign sense information is taken as the difference signal between the elements.

A somewhat different approach is disclosed by U.S. Pat. No. 3,498,127, wherein an orthogonal set of paired sensing elements is used to drive a cathode ray indicator displaying speed and direction.

Multi-component thermal anemometers are generally used outdoors in unattended or isolated locations and are openly exposed to the surrounding environment. In time they may accumulate dirt and their performance can deteriorate unless routine periodic cleaning is employed or naturally occurring rainfall cleanses the anemometer. Often, they are operated where varying amounts of oil fog and unburned hydrocarbon vapors are present, as at airports, offshore drilling platforms, near power plants, and near ship and naval vessel exhaust stacks. Regardless of configuration, and how the element pairs are used, dirt and oil vapor accumulation adversely affects anemometer calibration and, in the long term, measured component wind speed will decrease as anemometer sensitivity becomes impaired, while wind direction sensing is little affected. The differential paired-element anemometers ('147 and '795) provide a composite wind speed and direction component output and see little if any change in direction sensing precision since dirt and oil accumulation is random, is fairly uniform, and occurs as a common-mode phenomenon. Wind component magnitude output is decreased as the elements become coated, while element cosine response is virtually unchanged. The single-ended element pairs ('154 . . . '638) will see a more drastic change in sensitivity since their wind speed output is taken as the sum of two element signals for each component.

Historically, the weather services of the World use wind data in polar form (rho-theta) for wind speed and wind direction, and most mechanical and electromechanical wind sets are configured accordingly. Worldwide gathering and transmission of wind data is also handled in polar form. For thermal anemometer planar wind measurement, two components are customarily sensed, indicating North-South and East-West wind, or headwind and crosswind. Generally, wind direction, theta, is determined from two thermal anemometer orthogonal components by computing the cotangent or tangent function, and the magnitude of the wind resultant, rho, is taken as the square root of the sum of the squares of the orthogonal components. Interfacing with position synchro repeater type indicators is facilitated by the use of three sets of element pairs oriented in a wye or delta configuration in the horizontal plane. Appropriate signal conditioning can provide simulated transmitter synchro signals by using suppressed carrier modulation. Alternatively, a Scott transformation can be used for coordinate conversion from modulated two-phase, sine and cosine, to modulated three-phase components.

SUMMARY OF THE INVENTION

The present invention provides a significant improvement in the measurement of wind by thermal anemometer wind sets, accomplished by the incorporation of an independent omnidirectional transducer element in combination with a component directional transducer. The combination array thus provides a high quality resultant wind speed measurement together with a precision wind direction component measurement during adverse operating conditions. The omnidirectional element is in a form to minimize the influence of dirt, oil fog accumulation, salt accretion, and precipitation on resultant wind speed measurement precision. Its physical form and construction are optimized to reduce unwanted signal effects. Omnidirectional element configuration design is disclosed that is used to control spatial response to wind flow outside of the horizontal plane, the principle plane of interest for most meteorological wind observations. Wind set array embodiments, crosswind with resultant wind measurement, two-component wind direction with resultant wind measurement, and three-component wind direction with resultant wind measurement, are disclosed.

BRIEF DESCRIPTION OF THE DRAWING

FIG. 1 is a perspective view of a thermal anemometer transducer wind set made in accordance with the principles of the present invention;

FIG. 2 is an elevational section view of the cantilever polar omnidirectional transducer element structure illustrated in FIG. 1, taken along the line 2—2 thereof, and looking in the direction of the arrows;

FIG. 3 is a diagram showing the effect of change in the length-to-diameter ratio versus angle-of-attack of spatial flow response for the FIG. 1 omnidirectional transducer element.

DESCRIPTION OF THE PREFERRED EMBODIMENT

Figure 4:
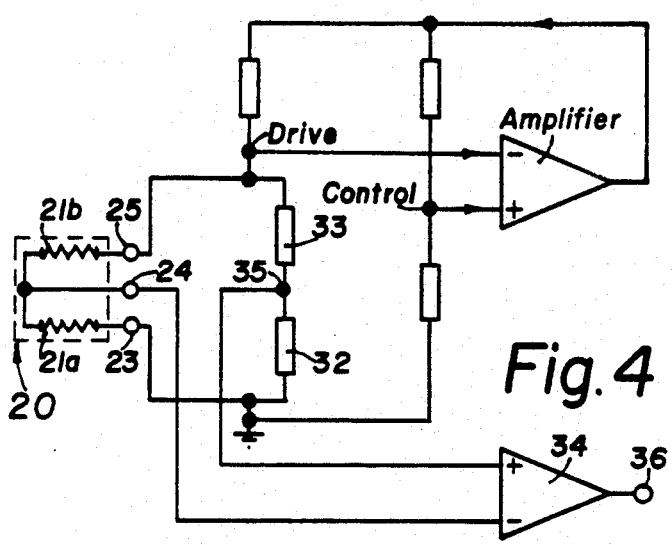
FIG. 4 is an electrical circuit schematic for a split sensing element direction readout.

Referring now to the drawing, and in particular to FIG. 1, the numeral 10 generally designates a thermal anemometer transducer wind set constructed in accordance with the principles of the present invention. The wind set 10 includes a directional thermal anemometer transducer 11 and an omnidirectional thermal anemometer transducer 20 whose longitudinal axis Z is oriented perpendicular to the X-Y plane containing the longitudinal axis Y of directional transducer 11. The transducer 11 includes two parallel sensing elements or members, generally indicated by the numerals 12a and 12b, which are resistive sensing elements whose lengths are substantially greater than their width or minor dimension. The elements 12a and 12b are physically separate from each other as shown by the split or division 13 along their axial length, and they are shown connected at one end 14. It is to be desired that they are as nearly identical as possible. Several different styles and constructions of directional thermal anemometer transducers that may be used as transducers 11 are taught by U.S. Pat. Nos. 3,677,085, 3,900,819, 4,024,761, 4,206,638, 4,279,147 and 4,794,795.

The illustrated X-Y-Z coordinate system of FIG. 1 defines the horizontal as the X-Y plane, with vertical direction to the zenith as Z. Transducer 11 response is to wind flow in the horizontal X-Y plane or, by analogy, the North-South East-West plane. Typical transducer 11 output is in the form $X = r \cos \theta$, where r is wind speed, $\theta$ is wind direction, and X is the crosswind component of wind in the X axis direction. Transducer 20 response to wind from any direction in the X-Y plane is uniform or omnidirectional and its output is r, indicating wind speed resultant magnitude in the X-Y plane. Transducer 20 response to wind away from the X-Y plane may be controlled by adjusting its length-to-diameter ratio. The sign of wind flow in the Y component direction can be determined by dividing the omnidirectional transducer 20 into two physical sectors and electrically reading out their difference while wind speed resultant magnitude r is electrically read out as their sum.

Directional thermal anemometer transducer 11 is shown with a single oval cross-section substrate and three lead wires 15, 16 and 17 attached to the ends of sensing elements 12a and 12b. Since one end of the element pair is joined together at 14, only one lead wire 17 is shown and it may be used as an electrical center tap. The series electrical combination of sensing elements 12a and 12b are excited and self-heated by electrical current supplied through lead wires 15 and 16, respectively. The lead wires are also used to physically support transducer 11 structurally on two posts 18 and 19 which are shown with a stepped shoulder 26 and 27, respectively. Posts 18 and 19 are identical in outline and their structure can be used as an interfering barrier, creating wake turbulence to enhance transducer 11 response to low angle wind flow or flow nearly parallel to the element axis Y. The use of a physical barrier to generate turbulence or aerodynamic dither to enhance low angle response is taught by U.S. Pat. No. 4,936,144, a division of U.S. Pat. No. 4,794,795. The stepped shoulders 26 and 27 may be eliminated from posts 18 and 19 for a simpler mounting, with a slight decrease in polar response accuracy of transducer 11.

Omnidirectional thermal anemometer transducer 20 is illustrated in FIG. 1 as a round cross-section cylindrical single-ended cantilever substrate 28 upon which is deposited a resistive sensing conductor 21. Transducer 20 is oriented along the Z axis, perpendicular to the response plane X-Y of transducer 11. Sensing conductor 21 is divided or split symmetrically along most of its length into two segments 21a and 21b that are joined at the outermost end 29. The cut or split 22 is in two axial positions 180° apart on the surface of cylinder 28 and in the X-Z plane. Three electrical lead wires 23, 24 and 25 are connected to sensing conductor 21 when it is split into two segments. The outboard end 29 is connected to lead wire 24 that serves as an electrical center tap for those segments 21a and 21b which are split and as a second connection for an unsplit or undivided sensing conductor 21. As shown in FIG. 4, direction sign sense or Y wind component polarity read out 36 may be determined by placing two series balancing resistors 32 and 33 in connection across sensing elements 21a and 21b together with the connection of a differential amplifier, or an operational amplifier operated as a comparator running wide open 34, between center tap lead wire 24 and the mid-point 35 of the balancing resistor pair 32 and 33. Lead wires 23 and 25 are connected to the inboard ends of segments 21a and 21b, respectively, when sensing conductor 21 is split. Referring again to FIG. 1, only one of lead wires 23 or 25 is needed for an unsplit sensing conductor 21. The entire surface area of sensing conductor 21 is exposed to flow without any interfering structure to disturb free field flow. A useful and preferred way to mount transducer 20 is into a bore in post 19 so that both posts 18 and 19 are symmetric for flow over transducer 11 during conditions of flow from either end along the Y axis.

A detailed discussion of the constant temperature anemometer and operating theory that applies to both transducers 11 and 20 can be found in pages 59 through 92 and 172 through 176 of a book entitled "Hot Wire Anemometry" by A. E. Perry, published in 1982 by Oxford University Press, New York, ISBN 0-19-856327-2. Thermal anemometers are also well described in chapter four, pages 99 through 154, of a book entitled "Fluid Mechanics Measurements", edited by Richard J. Goldstein and published in 1983 by Hemisphere Publishing Corporation, New York, ISBN 0-89116-244-5. A more specific discussion of the operation of a single sensing element in a controlled bridge circuit that provides advantages of differential operation is taught by co-pending U.S. patent application Ser. No. 07/521,594 filed on May 10, 1990, entitled "Constant Temperature Anemometer".

The above cited patent and literature references describe sensing element construction that generally uses metal films deposited upon refractory substrates. In certain applications, as on aircraft carriers or similar moving platforms where a known forced direction component of wind exists, it may not be necessary to determine the direction sign sense for the computed Y component of wind, and transducer 20 may be constructed without dividing or splitting sensing conductor 21. In this case the Y axis component of wind may readily be computed from the expression $Y = r \sin \theta$, where $\theta$ has been determined from the transducer 11 output with r from the transducer 20 output. An alternative construction for the sensing conductor 21 of unsplit transducer 20 may use fine, closely wound, resistance wire such as platinum or nickel, all overall protected and fused in place by a fired-on overglaze. Platinum wire is costly, is exceptionally stable, and is quite easy to use. Although substantially lower in cost, one must be careful when using nickel wire to avoid processing temperatures that exceed the metal's Curie point in order to avoid oxidation and unpredictable change in resistance characteristics.

FIG. 2 is an elevational section view of the omnidirectional thermal anemometer transducer 20 structure illustrated in FIG. 1, taken along the line 2—2 thereof, and looking in the direction of the arrows. Transducer 20 consists of an electrically non-conductive dense aluminum oxide refractory substrate 28 that is multiple-bored 30 to provide for the passage of lead wires 23, 24 and 25. Lead wire 24 is shown in the sectional view. Around the entire circumference of circular cylindrical substrate body 28 there is deposited a resistance film or coating of platinum metal that is split into two equal segments 21a and 21b that are joined at one end as aforedescribed. The circular cross-section assures that the evenly deposited metal film is uniformly responsive to impinging wind flow, regardless of wind direction. The supporting substrate body 28 may be chosen from other suitable materials that are electrically non-conductive, such as quartz, hard glass, mullite, and the like. The film split 22 is shown in relation to the coordinate system defined in FIG. 1. The segments 21a and 21b may have a further protective layer or layers 31 of glass overglaze, vitreous enamel, fused quartz, fused silica, a plastic such as Teflon TM, or other protective coating material that provides abrasion and wear resistance for the transducer 20. It is particularly useful to apply an overall protective layer of Teflon TM in order to take advantage of its well-known hydrophobic properties. This will greatly assist in self-cleaning of transducer 20 during prolonged outdoor exposure of wind set 10. The combination of a hydrophobic coating on a smooth vertical cylinder together with naturally occurring rainfall results in a transducer 20 that is least affected by environmental pollution.

FIG. 3 is a graph that illustrates the response of transducer 20 to wind flow as it moves out of the horizontal X-Y plane. The graph shows the change in response realized when transducers having different length-to-diameter (L/D) ratios are used. The length L of sensing conductor 21 is measured from the end 29 of transducer 20 to the lower edge of segments 21a and 21b. The diameter D is the overall diameter exposed to wind flow. If sensing conductor 21 begins below the upper limit of transducer 20, its tilt performance will necessarily be modified accordingly. The tilt angle $\phi$ is the angle of incidence or angle-of-attack for impinging wind away from the normal or away from perpendicular to the axis Z of transducer 20. The expression $\cos \phi + D/L \sin \phi$ is derived from the perceived change in overall transducer 20 projected surface area to laminar wind flow as transducer 20 is tilted into the wind. An inspection of the graph discloses that it is advantageous to use length-to-diameter ratios in the range of 3 to 5 in order to obtain least change in response to vertical component variations in wind flow. The obverse is equally true, that is, the wind set 10 can be dimensionally configured to be minimally responsive to changes in its mounting attitude that otherwise might adversely affect wind speed and wind direction measurement precision. The instrument designer has control of transducer 20 dimensions thereby shaping wind flow spatial response to suit his measurement application for wind set 10. When an L/D ratio in the range of 3 to 5 is used, the omnidirectional transducer 20 will tolerate large angles of tilt without appreciable change in output. With reduced tilt sensitivity, an interesting feature of wind set 10 is observed in that the wind set 10 is self-calibrating for wind perpendicular to the Y axis, independent of Z axis wind variations. At this point the value of wind resultant r must equal the value of crosswind X, where $X = r \cos \theta$. Any deviation may be attributed to the accumulation of contaminants on the directional transducer 11 so long as the transducer 20 outer surface is smooth and hydrophobic.

Figure 5:
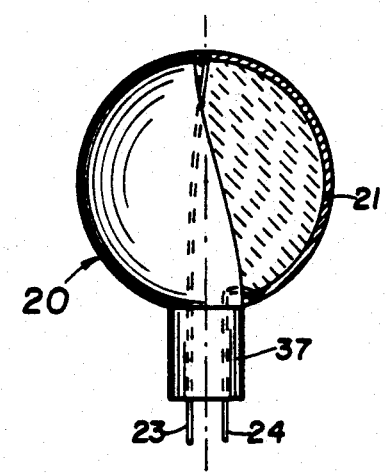
FIG. 5 is a view of a spherical omnidirectional sensing element with cutaway section.

In the limit, unsplit transducer 20 may be constructed as a sphere or bead, uniformly responsive to flow from all directions, save for underneath along its mounting stem 37, illustrated by FIG. 5, a sectional drawing in part. For both split and unsplit transducers 20, a larger value of L/D ratio for sensing conductor 21 will cause its relative response to wind flow to approach a cosine function. A practical limit on L/D ratio is determined by material strength, and is in the range of 10 to 20, beyond which further length increases become impractical. Typical transducer 20 substrate 28 diameters in the 1 to 2 millimeter range yield transducers of 3 to 6 mm length for L/D ratios of 3, and 10 to 20 mm for L/D ratios of 10. If multi-bore refractory tubing is used as substrate 28, one may be limited as to material availability from manufacturer's stock inventories. Their limitations are usually determined by tooling availability used to extrude their raw materials before firing. If quartz or hard glass is used, lead wires may be drawn together with the molten substrate material during substrate fabrication or it may be hot pressed into the near-molten substrate during application of high heat.

Figure 6:
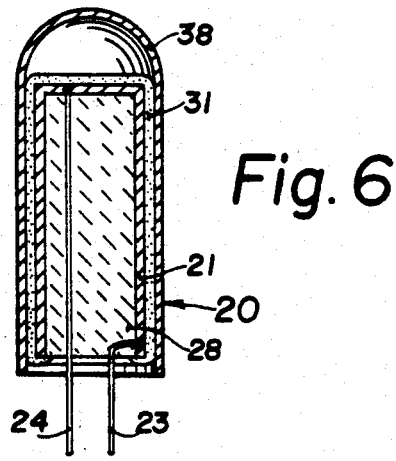
FIG. 6 is a longitudinal sectional drawing of single sensing element with a closed-end tubular shell.

Omnidirectional thermal anemometer transducer 20, in its unsplit form, may also be used as a sensitive and extremely rugged anemometer for measuring windspeed alone. Advantage may be taken of its insensitivity to tilt, or roll and pitch, when its L/D ratio is selected at time of fabrication as above described. It may be helpful to add additional mechanical protection to unsplit transducer 20 for certain freestanding applications where lightning strikes and random hailstones are to be expected. As shown in FIG. 6, a longitudinal drawing, thin closely fitted stainless steel protection tube 38 with a closed end can be slid over the transducer 20, using a heat conducting medium such as aluminum oxide filled silicone compound, heat sink grease for example, to assure heat transfer between sensing conductor 21, its protective layer or layers 31 that now serve as an electrical insulator, and the outer stainless steel protective shell 38. As above, a hydrophobic coating overall will keep transducer 20 free of contaminants and water. Since sensing conductor 21 is operated at an elevated temperature it is also self-deicing and is able to operate from a cold start during severe icing conditions since the entire cantilever structure of transducer 20 becomes hot. Consideration of FIG. 3 discloses that, for example, the following output variations may be predicted for transducer 20 that is fabricated to the listed L/D ratios for the indicated ranges of tilt angle, $\phi$.

| L/D | $\theta$ | Output Variation |
|-----|----------|------------------|
| 3   | ±45°     | ±6%              |
| 4   | ±33°     | ±3%              |
| 4.5 | ±30°     | ±2.4%            |
| 5   | ±27°     | ±2%              |
| 6   | ±22.5°   | ±1.4%            |

Figure 7:
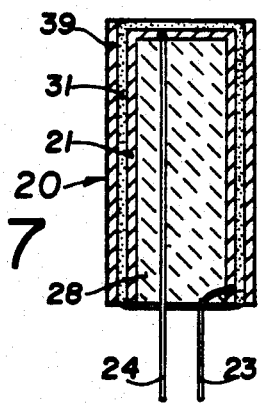
FIG. 7 is a longitudinal sectional drawing of a single sensing element with an open cylindrical metal shell.

Inclusion of an overall stainless steel protection jacket may somewhat distort tilt performance by virtue of "stem" conduction of heat longitudinally down through the stainless steel shell wall. Transducer 20 may seem, in performance, to be somewhat longer than it actually is. This effect can be minimized by using a right-angled cutoff profile as in FIG. 7, a longitudinal sectional drawing, rather than a rounded end to the transducer 20. Closest agreement to the ideal occurs when the protective layer or layers 31 are extremely thin. Limiting stainless steel shell 39 coverage to sensing conductor 21 removes the shell wall heat conduction path.

Although a minimum three sensing element, two transducer, wind set 10 has been disclosed as a preferred embodiment, transducer 20 may be used in combination with plural directional transducer 11 arrays that use multiple transducer 11 assemblies to determine two-component and three-phase wind direction measurements. In these arrays, transducer 20 is used unsplit and measures only wind magnitude r and not sign sense. The addition of an omnidirectional thermal anemometer transducer 20 to such arrays, where transducer 20 is oriented with its Z axis perpendicular to the plane of the array, can provide a highly accurate wind resultant signal that is least affected by environmental pollution caused by dirt and oil fog buildup on the directional component transducers.

A second embodiment of the invention includes two transducer 11 assemblies that are oriented orthogonally as an ell, a tee, or a crossed array, to make cartesian measurements of wind direction components, together with an independent measurement of wind speed by transducer 20. When the dual-component array is clean and free of surface contaminants, the component outputs will agree with the transducer 20 output for incident wind at the four cardinal points of the array coordinate system in the X-Y plane.

Figure 8:
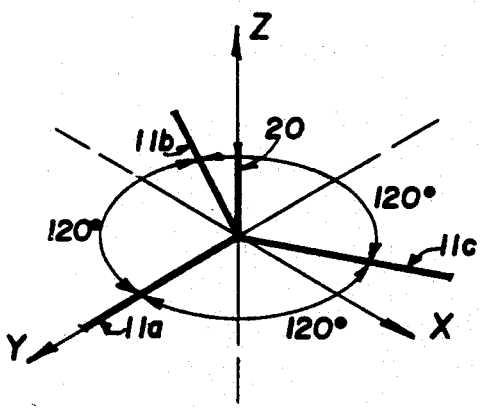
FIG. 8 is a diagrammatic view of a wye array together with an omnidirectional sensing element at the array apex.

In a third embodiment, shown diagrammatically by FIG. 8, three transducer 11 assemblies are oriented in the form of a wye array, 11a, 11b, and 11c, to make three-phase, 120° between each space phase, measurements. Such arrays are easily compatible with served display systems that use synchro mechanisms for data transmission and computation. The associated signal conditioners will necessarily include carrier modulation circuits to place the wind signals in a form compatible with the synchro devices. Wind speed resultant r is measured by a transducer 20 mounted at the apex or center of the array.

Figure 9:
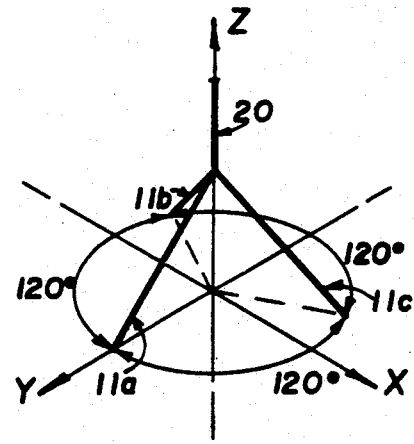
FIG. 9 is a diagrammatic view of a wye array lifted at its apex in the form of a pyramid together with an omnidirectional sensing element at the array apex.

In a fourth embodiment, diagrammatically shown by FIG. 9, a three-dimensional measurement of wind flow is made by a three-phase wye array that is lifted or raised at its apex, in the form of a pyramid outline, with a resultant wind transducer 20 oriented along the vertical Z axis of the pyramidal array, and mounted at the apex of the pyramid. Generally, meteorologists and atmospheric scientists agree that the earth's surface winds have a vertical component that is substantially less than horizontal winds, therefore the preferred orientation for a three-dimensional pyramidal array for most applications is with the apex of the pyramid pointing towards the zenith. For those applications where the general circulation is known to have a small vertical component, and the air flow is clean, free of contaminants, the pyramidal array may be used without a separate resultant wind transducer, thus saving one-fourth of the associated instrumentation.

Industrial Applicability

A significant advantage of the disclosed thermal anemometer wind set of the present invention is that, with no moving parts, it is sensitive down to near zero flow, a significantly lower performance threshold than the half mile per hour or greater for conventional newly-manufactured cup and vane wind sets, propeller anemometers, and virtually all other mechanical and electromechanical wind sets. It is far less complex and much lower in cost than research wind sets such as acoustic anemometers and laser velocimeters. The disclosed wind set is particularly well suited to low speed pollution diffusion applications as at power plants, nuclear complexes, chemical and petrochemical manufacturing complexes, wind alert and remote observing stations around airports, airport runway wake vortex alarms, and similar difficult broad dynamic range applications where responsive threshold wind determinations are equally as important as high speed measurement precision and instrument endurance. The ability to make accurate threshold measurements is enhanced by the disclosed wind set's equal responsiveness to extremely high wind speeds, in excess of hurricane velocities and even in the range of tornadic winds. The disclosed wind set is equally useful in more conventional meteorological applications at weather stations, on shipboard, and on off-shore platforms.

It is therefore to be understood that, within the scope of the appended claims, the invention may be practiced otherwise than as specifically described.

What is claimed is:

1. A thermal anemometer transducer wind set comprising:

(a) a directional thermal anemometer transducer with a pair of parallel oblong temperature coefficient resistive sensing conductors supported by an electrically non-conducting substrate;

(b) an omnidirectional thermal anemometer cantilever transducer with an electrically non-conducting circular cylindrical substrate with an adhered encircling temperature coefficient resistive sensing conductor, wherein the cantilever transducer longitudinal axis is oriented perpendicular to the directional transducer longitudinal axis, with said cantilever transducer being mounted at one end of said directional transducer;

(c) each of said sensing conductors being provided with electrical connection means, whereby each sensing conductor is self-heated by an electric current passed through said sensing conductor; and (d) mechanical structure supporting said transducers, each with respect to the other.

2. The thermal anemometer transducer wind set of claim 1, wherein:
   (a) said sensing conductor encircling said cantilever transducer is equally divided into two segments by a pair of axial cuts, 180° apart for at least a majority of the length of said cantilever transducer, with said pair of cuts defining a plane perpendicular to said directional transducer longitudinal axis; and
   (b) said segmented sensing conductor being provided with electrical connection means to its outboard midpoint as well as the segments at the inboard supported end of said cantilever transducer.

3. The thermal anemometer transducer wind set as defined in claim 2, wherein the cantilever transducer segmented sensing conductor is operatively connected to a series pair of balancing resistors forming a Wheatstone bridge, said midpoint of said segmented sensing conductor and the midpoint of said balancing resistor operatively connected to an amplifier/comparator thereby providing sign sense readout of impinging wind from said bridge, when said cantilever transducer is operatively connected into a constant temperature anemometer controlled bridge excitation circuit.

4. A thermal anemometer transducer wind set comprising:
   (a) two directional thermal anemometer transducers, each with a pair of parallel oblong temperature coefficient resistive sensing conductors supported by an electrically non-conducting substrate, wherein the longitudinal axes of the directional transducers are oriented perpendicular to each other and the planes containing the longitudinal axes of the pairs of parallel sensing conductors are oriented parallel to each other;
   (b) an omnidirectional thermal anemometer cantilever transducer with an electrically non-conducting circular cylindrical substrate with an adhered encircling temperature coefficient resistive conductor, wherein the longitudinal axis of said cantilever transducer is oriented perpendicular to said parallel planes, with said cantilever transducer being mounted at one end of one of said directional transducers;
   (c) each of said sensing conductors being provided with electrical connection means, whereby each sensing conductor is self-heated by an electrical current passed through said sensing conductor; and
   (d) mechanical means supporting said transducers, each with respect to the other.

5. The thermal anemometer transducer wind set as defined in claim 4, wherein said cantilever transducer is mechanically mounted in close proximity to said directional transducers.

6. A thermal anemometer transducer wind set comprising:
   (a) three directional thermal anemometer transducers, each with a pair of parallel oblong temperature coefficient resistive sensing conductors supported by an electrically non-conducting substrate, wherein said directional transducers are mounted in a coplanar array, with 120° between the longitudinal axes of said three transducers, thereby forming a wye configuration;
   (b) an omnidirectional thermal anemometer cantilever transducer with an electrically non-conducting circular cylindrical substrate with an adhered encircling temperature coefficient resistive conductor, wherein said cantilever transducer is mounted at the apex of said coplanar array, the longitudinal axis of the cantilever transducer oriented perpendicular to the plane of said array;
   (c) each of said sensing conductors being provided with electrical connection means, whereby each sensing conductor is self-heated by an electrical current passed through said sensing conductor; and
   (d) mechanical means supporting said transducers, each with respect to the other.

7. The thermal anemometer transducer wind set as defined in claims 1, 4 or 6, wherein said omnidirectional thermal anemometer cantilever transducer includes an overall protective coating.

8. The thermal anemometer transducer wind set of claim 7, wherein said protective coating includes an outer hydrophobic coating.

9. The thermal anemometer transducer wind set of claim 7, wherein said protective coating is mechanically covered by a closed-end thin wall metal tube in close thermal contact with said sensing conductor.

10. The thermal anemometer transducer wind set of claim 9, wherein coverage by said metal tube is limited to said sensing conductor area.

11. The thermal anemometer transducer wind set of claim 9, wherein said metal tube is covered with an outer hydrophobic coating.

12. The thermal anemometer transducer wind set of clam 10, wherein said metal tube is covered with an outer hydrophobic coating.

13. A thermal anemometer transducer wind set comprising:
   (a) three directional thermal anemometer transducers, each with a pair of parallel oblong temperature coefficient resistive sensing conductors supported by an electrically non-conducting substrate, wherein the directional transducers are mounted in a pyramidal array wherein the longitudinal axis of each of the three directional transducers is oriented parallel to a different edge of a pyramid having an equilateral triangular base and an apex, each said different edge being between the base and the apex,
   (b) an omnidirectional thermal anemometer cantilever transducer with an electrically non-conducting circular cylindrical substrate with an adhered encircling temperature coefficient resistive conductor, wherein said cantilever transducer is mounted at the apex of said pyramidal array, the longitudinal axis of the centilever transducer oriented parallel to the axis through the center of the base of the pyramid and the apex of the pyramid;
   (c) each of said sensing conductors being provided with electrical connection means, whereby each sensing conductor is self-heated by an electrical current passes through said sensing conductor; and
   (d) mechanical supporting said transducers, each with respect to the other.

14. A thermal anemometer transducer wind set comprising:
   (a) three directional thermal anemometer transducers, each with a pair of parallel oblong temperature coefficient resistive sensing conductors supported by an electrically non-conducting substrate, wherein the directional transducers are mounted in a pyramidal array wherein the longitudinal axis of each of the three directional transducers is oriented parallel to a different edge of a pyramid having an equilateral triangular base and an apex, each said different edge being between the base and the apex, (b) each of said sensing conductors being provided with electrical connection means, whereby each sensing conductor is self-heated by an electrical current passed through said sensing conductor; and (c) mechanical means supporting said transducers, each with respect to the other.

15. The thermal anemometer transducer wind set as defined in claims 1, 2, 4, 6 or 13, wherein said omnidirectional thermal anemometer cantilever transducer has a length-to-diameter ratio in the range of 3 to less than 8, thereby minimizing transducer response variations to change in angle-of-attack for impinging wind.

16. The thermal anemometer transducer wind set as defined in claims 1, 2, 4, 6 or 13, wherein said omnidirectional thermal anemometer cantilever transducer has a length-to-diameter ratio in the range of 8 to 30, thereby causing transducer response to variation in angle-of-attack for impinging wind to approach a cosine curve, where the cantilever transducer longitudinal axis perpendicular flow is defined as zero angle-of-attack.

17. The thermal anemometer transducer wind set as defined in claims 1, 2, 4, 6 or 13 wherein said omnidirectional thermal anemometer transducer is in the form of a sphere.

18. The thermal anemometer wind set as defined in claims 1, 4, 6 or 13, wherein said omnidirectional thermal anemometer transducer is in the form of a bead.

19. The thermal anemometer transducer wind set as defined in claims 1, 2, 4, 6 or 13, wherein each end of said directional thermal anemometer transducer or transducers is mechanically supported by a support post that is extended over each end of said transducer or transducers to form an interfering flow barrier, thereby creating wake turbulence to enhance the response of each transducer to low angle wind flow nearly parallel to each transducer longitudinal axis.

* * * * *